United States Patent Office 3,381,013
Patented Apr. 30, 1968

3,381,013
HETEROCYCLICAMINO ETHERS OF
BENZYLPHENOLS
William F. Minor, Fayetteville, N.Y., assignor to Bristol-
Myers Company, New York, N.Y., a corporation of
Delaware
No Drawing. Continuation-in-part of application Ser. No.
337,756, Jan. 15, 1964. This application Dec. 29, 1964,
Ser. No. 421,995
8 Claims. (Cl. 260—294.7)

ABSTRACT OF THE DISCLOSURE

Heterocyclicamino ethers of benzylphenols are prepared by the reaction of a metal salt of the heteroamine with benzyl phenol. These ethers are antihistamines having a cough and nausea suppressant effect.

This application is a continuation-in-part of my prior, copending application Ser. No. 337,756, filed Jan. 15, 1964 and now abandoned.

This invention relates to novel antihistaminic and antifungal compounds. More particularly, this invention relates to certain basic ethers of substituted benzylphenols.

It is generally recognized that the liberation of histamine into the tissues of man, which can be brought about by a number of means, is responsible for many allergic manifestations. It is also well-known that certain drugs, called antihistamines, are effective in blocking the action of histamine and hence, in alleviating the symptoms of many allergic reactions. Unfortunately, however, antihistaminic drugs frequently elicit side reactions, such as nausea, which, although rarely serious, are undesirable. Moreover, most antihistamines do not have any antitussive effect, i.e. they do not act to relieve or prevent coughs which frequently accompany allergic manifestations.

It is an object of this invention to provide a new class of compounds which are valuable anti-allergic agents and which do not possess many of the disadvantages commonly associated with antihistamines. It is a further object of this invention to provide such novel compounds which also possess antinausea and antitussive activity. Finally, it is an object of this invention to provide novel compounds which exhibit antifungal activity upon topical application to plants and upon topical, parenteral and oral administration to animals.

These and other objects have been attained by the practice of this invention which, briefly, comprises providing a compound selected from the group consisting of basic ethers of benzyl phenols having the same general formula

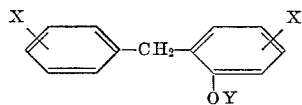

wherein X is a member selected from the group consisting of hydrogen, halogen, (lower)alkoxy, (lower)alkyl and trifluoromethyl, Y designates a member selected from the radicals

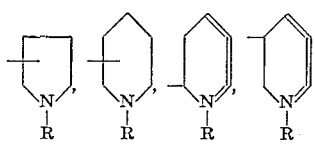

and

and R is a member selected from the group consisting of hydrogen, (lower)alkyl and phenyl(lower)alkyl, and nontoxic salts thereof. Examples of nontoxic salts of the basic ethers of benzyl phenols of this invention include their acid addition salts with inorganic or organic acids, such as hydrochloric acid, hydrobromic acid, hydriodic acid, sulfuric acid, phosphoric acid, maleic acid, acetic acid, citric acid, oxalic acid, succinic acid, benzoic acid, tartaric acid, phthalic acid, picric acid, fumaric acid, etc.; and their quaternary salts.

The preferred embodiments of the present invention are the salts and free bases of the compounds of the formula

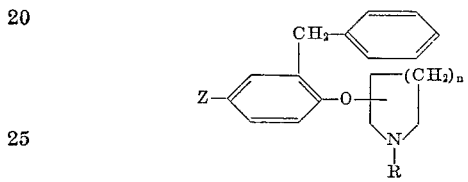

wherein Z is hydrogen or chloro, $n$ is one or two and R is (lower)alkyl. It is particularly preferred that the ether link be located at the 3-position of the pyrrolidine ring and at the 3- or 4-position of the piperidine ring.

The compounds of this invention are potent antihistaminic, antinausea and antitussive agents. Thus, they are effective in blocking the action of histamine and hence, in alleviating the symptoms of many allergic reactions. Moreover, they are useful in the control of nausea resulting from a wide variety of causes. Furthermore, these compounds are effective in controlling coughing due to various causes. The compounds of this invention may be administered to humans as the free base or as a nontoxic salt thereof. They may be given orally, parenterally or rectally. When used to combat fungal diseases in plants the compounds of the present invention are applied topically, e.g. by spraying an aqueous solution containing a concentration by weight of 0.01 to 1.0 percent of a water-soluble salt of the compound such as the hydrochloride.

The compounds of the present invention may be prepared, for example, by reacting a metal salt of a benzyl phenol having the general formula

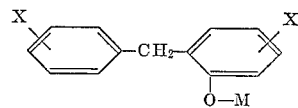

with a compound having the general formula Z—Y in which X and Y are the same as defined above, M is a metal group and preferably an alkali metal group, and Z is a halo group such as chloro, bromo, iodo or fluoro. If one or both of the groups X in the product are halogens and it is desired to prepare the corresponding non-halogenated compound, the halogen groups may be removed by hydrogenation, e.g., over palladium.

It is not necessary that the metal salt of the benzyl phenol be separately prepared; it may conveniently be prepared in situ, such as by the addition to the reaction mixture of the benzyl phenol and about an equimolar amount of a metal hydroxide such as sodium hydroxide. Furthermore, the reactant Z—Y need not be added as the free base; one may, if deemed desirable or more convenient, add a salt of the compound Z—Y, e.g. the hydrochloride, to the reaction mixture along with about an equimolar amount of a base such as sodium hydroxide.

If one or more of the reactants is a liquid, this reaction may be run without added solvent. It is preferred, however, that the reaction be conducted in an inert organic solvent; examples of such solvents include benzene, toluene, methylisobutyl ketone and xylene.

This reaction takes place very slowly below about 50° C. and it is preferred that the reaction mixture be heated to increase the reaction rate. It is convenient to run the reaction at the reflux temperature of the organic solvent.

Quaternary salts of the compounds of this invention may be prepared, for example, by reacting a basic ether of a benzyl phenol having the general formula

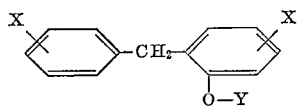

wherein X and Y are the same as defined above, with an alkyl halide, aralkyl halide, alkyl sulfate, etc.

The reactants from which the compounds of this invention may be prepared are either commercially available or are known compounds or are readily synthesized by methods well-known in the art. Thus, 3- and 4-chloro-1-alkylpiperidine hydrochlorides may be obtained commercially while 3-chloropyrrolidines may be prepared as outlined in J. Chem. Soc., 2780 (1960), from 3-hydroxy-1-substituted pyrrolidines. The preparations of 3-hydroxy-1-substituted pyrrolidines are described in J. Med. Pharma. Chem., 1, 73 (1959) and in U.S. Patent No. 2,956,062. 2- and 3-chloroquinuclidine are prepared according to Helv. Chim. Acta, 40, 2170 (1957). The preparation of various substituted benzyl phenols is described in U.S. Patent No. 2,703,324.

The following examples illustrate the best modes contemplated for carrying out this invention.

Example 1

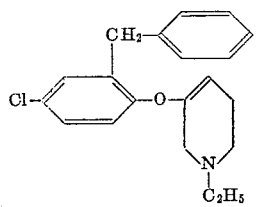

3-(2-benzyl-4-chlorophenoxy)-1-ethylpiperidine

A mixture is prepared of 3-chloro-1-ethylpiperidine hydrochloride (18.4 g.; 0.1 mole), 2-benzyl-4-chlorophenol (21.9 g.; 0.1 mole) and flake sodium hydroxide (8.8 g.; 0.2 mole) in 150 ml. of xylene. The mixture is refluxed for two days and then 200 ml. of water are added to dissolve inorganic material. The organic layer is washed twice with two 100 ml. portions of water and the xylene layer is extracted with three 100 ml. portions of 6 N HCl. The acid extracts are combined, washed once with ether and the pH is adjusted to 11 by the addition of 50% sodium hydroxide. The resultant solution is extracted three times with 100 ml. portions of ether. The ether extracts are combined, washed with water, washed with saturated sodium chloride solution and dried over $K_2CO_3$. The mixture is then filtered and the ether is removed in vacuo. The product (20.6 g.; 62% of theoretical yield), is a viscous oil having a boiling point of 186–193° C., at a pressure of 0.5 mm. of mercury.

Analysis.—Calc'd for $C_{20}H_{24}ClNO$: C, 72.8; H, 7:30; N, 4.20; Cl, 10.8. Found: C, 73.0; H, 7.44; N, 4.08; Cl, 10.95.

Example 2

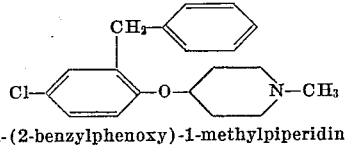

4-(2-benzylphenoxy)-1-methylpiperidine

A mixture is prepared of 4-chloro-1-methylpiperidine hydrochloride (50.0 g.; 0.29 mole), 2-benzyl-4-chlorophenol (64.5 g.; 0.29 mole), and flake sodium hydroxide (23.5 g.; 0.59 mole) in 250 ml. of toluene. The mixture is refluxed for 18 hours, cooled and then 200 ml. of water are added to dissolve solid impurities. The aqueous phase is separated and discarded. The organic phase is extracted three times with 100 ml. portions of 6 N HCl. The combined acid extracts are allowed to stand for 1½ hours, during which time a precipitate forms. The prepicitate is collected and recrystallized from a mixture of isopropanol and Skellysolve B. An oil is formed which is stripped of solvents in vacuo. The solid residue is recrystallized from ether to yield a white, crystalline product (51.5 g.; 50% of theoretical yield) which is the hydrochloride salt of 4-(2-benzyl-4-chlorophenoxy)-1-methylpiperidine having a melting point of 165–166° C.

Analysis.—Calc'd for $C_{19}H_{22}ClNO \cdot HCl$: C, 65.2; H, 6.58. Found: C, 65.2; H, 6.54.

Example 3

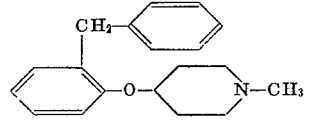

4-(2-benzylphenoxy)-1-methylpiperidine

A solution of 4-(2-benzyl-4-chlorophenoxy)-1-methylpiperidine obtained by dissolving the product of Example 2 in water, adding sufficient NaOH to render the solution basic, extracting with ether and removing the ether (10.0 g.; 0.03 mole), in 200 ml. of absolute ethanol is hydrogenated over 4.0 g. of 30% palladium on diatomaceous earth. The catalyst is removed by filtration and the filtrate is concentrated in vacuo. The resultant oil is suspended in water to form an emulsion and sufficient 10% sodium hydroxide is added to render the emulsion basic. The mixture is then extracted with three 125 ml. portions of methylene chloride. The combined methylene chloride extracts are washed with water and filtered through $MgSO_4$. The filtrate is concentrated in vacuo resulting in a residual yellow oil as the product. The product (1.1 g.; 12.5% of theoretical yield), is determined to have a boiling point of 150–152° C. at a pressure of 15 mm. of mercury.

Analysis.—Calc'd for $C_{19}H_{23}NO$: C, 81.1; H, 8.24. Found: C, 81.3; H, 8.25.

Example 4

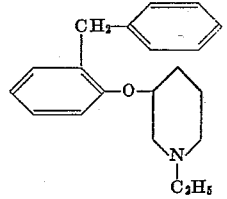

3-(2-benzylphenoxy)-1-ethylpiperidine

A solution of 3-(2-benzyl-4-chlorophenoxy)-1-ethylpiperidine (20.3 g.; 0.062 mole) in 350 ml. of absolute ethanol is hydrogenated over 7.9 g. of 30% palladium on diatomaceous earth. The catalyst is then removed by filtration, the filtrate is concentrated to dryness in vacuo and the residue is dissolved in water. The solution is then made basic by the addition of sodium hydroxide and is extracted three times with methylene chloride. The combined methylene chloride extracts are washed with water and are filtered through anhydrous MgSO₄. The filtrate is concentrated in vacuo leaving a residual pale yellow oil (10.0 g.; 55% of theoretical yield) having a boiling point of 182–184° C. at a pressure of 1.2 mm. of mercury.

*Analysis.*—Calc'd for $C_{20}H_{25}NO$: C, 81.3; H, 8.53; N, 4.74. Found: C, 80.8; H, 8.42; N, 4.58.

Example 5

In the process of Example 1, when the 3-chloro-1-ethyl-piperidine is replaced with 0.1 mole of 2-chloropyrrolidine hydrochloride,
3-chloropyrrolidine hydrochloride,
2-chloro-1-n-propylpyrrolidine hydrochloride,
2-chloro-1-benzylpiperidine hydrochloride,
4-chloropiperidine hydrochloride,
3-chloropyridine hydrochloride,
2-chloroquinuclidine hydrochloride,
3-chloroquinuclidine hydrochloride and
2-chloropyridine hydrochloride, respectively, there are obtained, instead of 3 - (2-benzyl-4-chlorophenoxy)-1-ethylpiperidine as the final product, the corresponding 2-(2-benzyl-4-chlorophenoxy)pyrrolidine,
3-(2-benzyl-4-chlorophenoxy)pyrrolidine,
2-(2-benzyl-4-chlorophenoxy)-1-n-propylpyrrolidine,
2-(2-benzyl-4-chlorophenoxy)-1-benzylpiperidine,
4-(2-benzyl-4-chlorophenoxy)piperidine,
3-(2-benzyl-4-chlorophenoxy)pyridine,
2-(2-benzyl-4-chlorophenoxy)quinuclidine,
3-(2-benzyl-4-chlorophenoxy)quinuclidine and
2-(2-benzyl-4-chlorophenoxy)pyridine.

Example 6

In the process of Example 1, when the 2-benzyl-4-chlorophenol is replaced with 0.1 mole of 2-benzyl-4-ethoxyphenol,
2-benzyl-4-methoxyphenol,
2-benzyl-4-t-butylphenol,
2-(4'-isopropylbenzyl)phenol,
2-(4'-methoxybenzyl)phenol and 2-(4'-fluorobenzyl)phenol, respectively, there are obtained, instead of 3-(2-benzyl-4-chlorophenoxy)-1-ethylpiperidine as the final product, the corresponding 3-(2-benzyl-4-ethoxyphenoxy)-1-ethylpiperidine,
3-(2-benzyl-4-methoxyphenoxy)-1-ethylpiperidine,
3-(2-benzyl-4-t-butylphenoxy)-1-ethylpiperidine,
3-[2-(4'-isopropylbenzyl)-phenoxy]-1-ethylpiperidine,
3-[2-(4'-methoxybenzyl)phenoxy]-1-ethylpiperidine, and
3-[2-(4'-fluorobenzyl)phenoxy]-1-ethylpiperidine.

Example 7

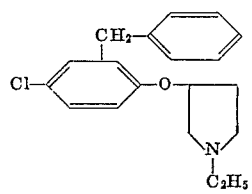

3-(2-benzyl-4-chlorophenoxy)-1-ethylpyrrolidine

A mixture of 2-benzyl-4-chlorophenol (21.9 g.; 0.10 mole) and flake sodium hydroxide (4.0 g.; 0.10 mole) in 175 ml. of toluene was refluxed until the theoretical amount of water had been removed through a trap. To the stirred, refluxing solution there was added during 1¾ hours a solution of 3-chloro-1-ethylpyrrolidine (10.5 g.; 0.078 mole) in 40 ml. of toluene. After 17 hours at reflux the cooled mixture was washed with water and then extracted three times with 6 N hydrochloric acid. Work-up of these extracts yielded only 3-chloro-1-ethylpyrrolidine. Distillation of the toluene solution left a brown oil which was dissolved in ether and extracted with 6 N hydrochloric acid. The acid extracts were made strongly basic with 50% sodium hydroxide and extracted with ether. Drying and distillation gave 1.8 g. (7.3%) of 3 - (2 - benzyl-4-chlorophenoxy)-1-ethylpyrrolidine amber oil; B.P. 153–156° C./0.10 mm. This oil was converted to the dihydrogen citrate and recrystallized from acetonitrile; M.P. 118–122° C.

*Analysis.*—Calc'd for $C_{25}H_{29}ClNO_8$: C, 59.2; H, 5.76; N, 2.76. Found: C, 59.3; H, 6.19; N, 2.77.

Example 8

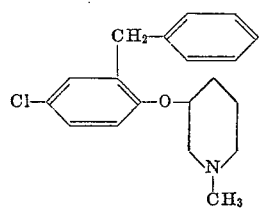

3-(2-benzyl-4-chlorophenoxy)-1-methylpiperidine 3-chloro-1-methylpiperidine hydrochloride (101.0 g.; 0.60 mole) was reacted with 2-benzyl-4-chlorophenol (130.0 g.; 0.60 mole) and flake sodium hydroxide (47.7 g.; 1.19 moles) in 500 ml. of toluene by the procedure of Example 1. The product could not be extracted into dilute hydrochloric acid and was isolated by the procedure of Example 7; after distillation (B.P. 170–172° C./0.75 mm.) it solidified and was recrystallized from methanol to yield 29.6 g. (16%) of material having M.P. 96–97° C. It was found by infrared measurements to contain an appreciable quantity of phenolic material, and was dissolved in ether and extracted several times with Claisen's alkali. Work-up of the ether solution and recrystallization of the residue from methyl alcohol-water gave 3-(2-benzyl-4-chlorophenoxy)-1-methylpiperidine of M.P. 59–60° C.

*Analysis.*—Calc'd for $C_{19}H_{22}ClNO$: C, 72.3; H, 7.03. Found: C, 72.5; H, 6.72.

Example 9

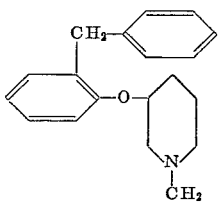

3-(2-benzylphenoxy)-1-methylpiperidine

By the procedure described in Example 4, using 3-(2-benzyl-4-chlorophenoxy)-1-methylpiperidine (3.2 g.; 0.01 mole), 30% palladium on diatomaceous earth (3 g.) and 100 ml. of absolute ethanol, there was obtained 1.2 g. of 3-(2-benzylphenoxy)-1-methylpiperidine as an oil after evaporative distillation at 105–110° C./0.08 mm.

*Analysis.*—Calc'd for $C_{19}H_{23}NO$: C, 81.1; H, 8.24. Found: C, 81.1; H, 7.84.

Example 10

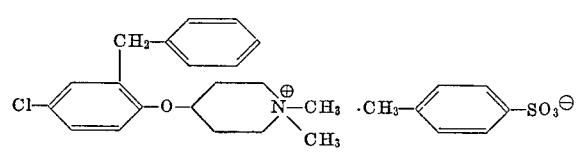

4-(2-benzyl-4-chlorophenoxy)-1,1-dimethylpiperidinium p-toluenesulfonate

An acetone (50 ml.) solution of 4-(2-benzyl-4-chlorophenoxy)-1-methylpiperidine, obtained from 12.6 g. (0.035 mole) of its hydrochloride salt as outlined in Example 3 was treated with methyl p-toluenesulfonate (7.5 g.; 0.04 mole) and refluxed for 3 hours. Evaporation of the solvent left an oil which slowly crystallized and was then recrystallized twice from acetonitrile to yield 3.4 g. (19%) of 4-(2-benzyl-4-chlorophenoxy)-1,1-dimethyl-piperidinium p-toluenesulfonate of M.P. 144–145° C.

*Analysis.*—Calc'd for $C_{27}H_{32}ClNO_4S$: C, 64.8; H, 6.44; N, 2.79. Found: C, 64.5; H, 6.42; N, 2.49.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. A member selected from the group consisting of compounds of the formula

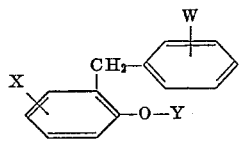

wherein each of X and W is a member selected from the group consisting of hydrogen, halogen, (lower)alkoxy, (lower)alkyl and trifluoromethyl and Y is a member selected from the group consisting of the radicals of the formula

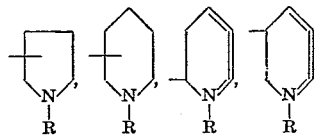

and

in which R represents a member selected from the group consisting of hydrogen, (lower)alkyl and phenyl(lower)alkyl; and nontoxic, pharmaceutically acceptable acid addition and quaternary salts thereof.

2. A compound of the formula

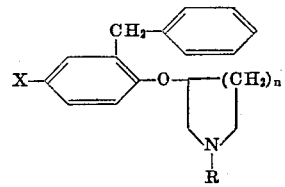

wherein $n$ is an integer from one to two inclusive, R represents (lower)alkyl and X is a hydrogen or chlorine atom.

3. A compound of the formula

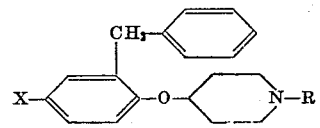

wherein R represents (lower) alkyl and X is a hydrogen or chlorine atom.

4. 3-(2-benzyl-4-chlorophenoxy)-1-ethylpiperidine.
5. 4-(2-benzyl-4-chlorophenoxy)-1-methylpiperidine.
6. 4-(2-benzylphenoxy)-1-methylpiperidine.
7. 3-(2-benzylphenoxy)-1-ethylpiperidine.
8. 3-(2-benzyl-4-chlorophenoxy)-1-ethylpyrrolidine.

References Cited

UNITED STATES PATENTS

| | | | |
|---|---|---|---|
| 2,703,324 | 3/1955 | Binkley et al. | 260—294.7 |
| 2,768,207 | 10/1956 | Cheney et al. | 260—294.7 |
| 2,966,518 | 12/1960 | Johnson | 260—294.7 |
| 3,117,059 | 1/1964 | Rubinstein et al. | 260—294.7 |

OTHER REFERENCES

Burger: Medicinal Chem., 2nd ed., Interscience, New York, 960 (pp. 524–533).

JOHN D. RANDOLPH, *Primary Examiner.*

N. S. MILESTONE, WALTER A. MODANCE, *Examiners.*

A. D. SPEVACK, *Assistant Examiner.*